(No Model.)
A. N. SPRAGUE.
FILTER.
No. 603,834. Patented May 10, 1898.
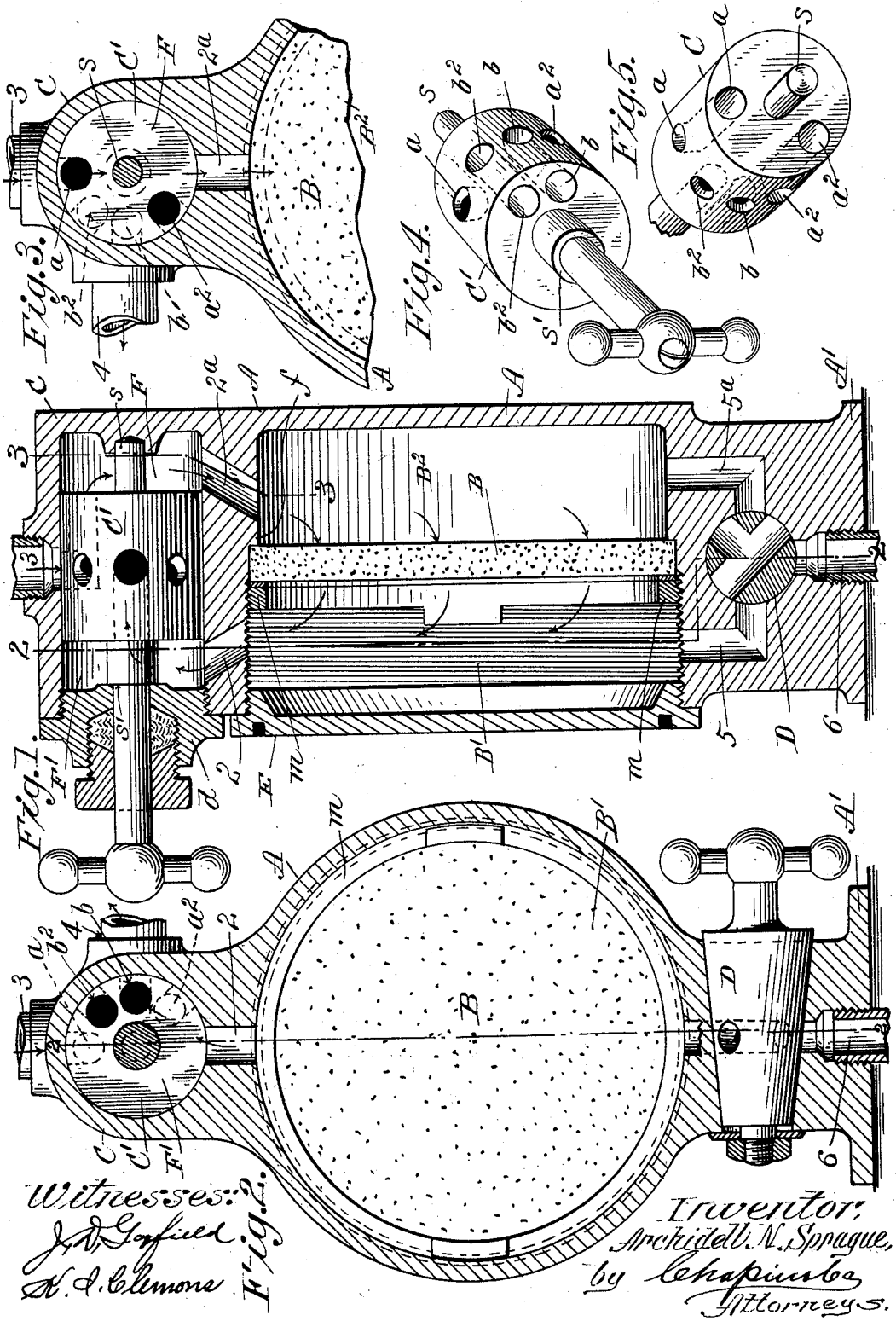
Witnesses:
J. A. Garfield
N. A. Clemons
Inventor:
Archibell N. Sprague,
by Chapin & Co.
Attorneys.

UNITED STATES PATENT OFFICE.

ARCHIDELL N. SPRAGUE, OF WESTFIELD, MASSACHUSETTS.

FILTER.

SPECIFICATION forming part of Letters Patent No. 603,834, dated May 10, 1898.

Application filed November 6, 1897. Serial No. 657,641. (No model.)

*To all whom it may concern:*

Be it known that I, ARCHIDELL N. SPRAGUE, a citizen of the United States of America, residing at Westfield, in the county of Hampden and State of Massachusetts, have invented new and useful Improvements in Filters, of which the following is a specification.

This invention relates to filters, and has for its object the construction of a filter whose filtering medium can be readily cleaned or replaced by another to adapt it to the varying conditions under which it may be used and through which medium the current of water to be filtered can be directed at will in either direction and which is easily drained should it be necessary to cut off the supply of water therefrom; and the invention consists in the construction substantially as described in the accompanying specification and pointed out in the claims forming a part thereof.

In the drawings forming part of this specification, Figure 1 is a vertical sectional view of a filter embodying my invention, said section being taken substantially on line 2 2, Fig. 2. Fig. 2 is a sectional elevation on line 2 2, Fig. 1, except that the plug-cock at the base of the filter is shown in full lines. Fig. 3 is a section on line 3 3, Fig. 1, looking to the left. Fig. 4 is a perspective view of the valve controlling the inlet and outlet ports; and Fig. 5 is a view similar to Fig. 4, showing the opposite end of said valve.

Referring to the drawings, A represents the metal body of the filter, having a suitable base A'. Said body is preferably of a cylindrical form, having one closed end, as shown, and a disk B, of filtering medium, divides the interior in a plane parallel with said closed end into two cylindrical chambers B' and $B^2$ of substantially equal dimensions. Said disk B is fixed in said body A in the position shown by being clamped between a shoulder $f$, turned on the inner cylindrical wall of the body of the filter, and a ring $m$, screwed up against the opposite side of said disk, a suitable packing-ring or gasket being interposed between said ring and the disk B to make a tight joint and to prevent the disk from being broken by the ring $m$ being screwed up too tightly thereagainst. The same screw-thread which is cut on the interior wall of the filter-body to receive the ring $m$ may receive the screw-threaded disk E, which closes the open side of said body, or said disk may be secured over said open side in any other convenient manner. Above said body part A and preferably cast integral therewith is the valve-body C, within which is the cylindrical four-way valve C', which controls the inlet-port 3 and the outlet-port 4 in said valve-body. Said four-way valve C' is of less length than the valve-body C, and being located at equal distance from each end of said valve-body the chambers at each end thereof represented by F F' are formed. Said valve is provided with ports, (four in number,) all located within one-half of the valve circumferentially. Of said ports the two end ports $a$ $a^2$ extend from the periphery of the valve through one end thereof into the chamber F, and the other two ports $b$ $b^2$ extend from the periphery through the opposite end of the valve into the chamber F', and all of the said ports are in line on the periphery and ends of said valve. The latter is supported for rotation in the valve-body C in any convenient manner. In the drawings the valve-stem $s$ is shown bearing at one end thereof in a socket formed in the end of the valve-body, and said stem on the opposite side of the valve passes through a stuffing-box and is supported therein. Said stem is made with a shoulder $s'$ thereon, against which the cap $d$, which closes the end of the valve-body, bears, whereby the ports of said valve are retained for rotation in a line with the outlet and inlet ports 4 and 3. Two passages 2 $2^a$ are located one near each end of said valve-body C and communicating with the chambers B' and $B^2$.

At the lower end of the filter-body, within the base A', is located the three-way plug-cock D, which controls the draining or cleaning passages 5 $5^a$, leading from the chambers B' $B^2$ to a suitable waste-pipe 6. For the sake of convenience the plug-cock D is located at right angles to the axis of the valve C'.

The filtering-disk B may be of any suitable filtering medium which can be made into disks. One material which has been found in practice to answer every requirement is emery, which is mixed with a suitable substance to permit its being molded into the proper shapes, which are then baked under a suitable degree of heat, which causes the substance with which said emery is mixed either to fuse or to harden sufficiently to give to said baked disk a suitable hardness and porosity.

Assuming that the inlet-pipe 3 is connected with a suitable source of supply which furnishes water to the filter under a sufficient head for the proper operation of the latter and the cock D turned so as to close the passages 5 $5^a$, the ports in the valve C' (see Figs. 1 and 2) are so located relative to said inlet and outlet pipes that a current of water from said inlet-pipe will pass through the end port $a$ in said valve (represented in dotted lines in Fig. 2 and in full lines in Fig. 3 of the drawings) and into the chamber F of the valve-body C, then down through the passage $2^a$ into the cylindrical chamber $B^2$, through the filtering-disk B into chamber B', up through the passage 2 into the chamber F', and through the port $b$ to the outlet-pipe 4. This is the normal course of water passing through the filter, and it may be made to pass through the filtering-disk in the opposite direction to this by turning the four-way valve C' one-eighth to the left, as viewed in Fig. 2, which will operate to close the ports $a$ and $b$ by having one of the orifices of each against the wall of the valve-body C and bringing the port $a^2$ and the port $b^2$ opposite the outlet and inlet pipes, respectively. It will be seen that the port $a^2$ opens into the chamber F and the port $b^2$ into the chamber F', and thus the water from the inlet is directed into the chamber B' first, and passes from thence through the disk B, and following in reverse the course above described passes out through the same outlet 4. If the four-way valve C' is now rotated one-eighth farther to the left, the port $b$ will lie opposite the inlet 3 and the outlet 4 will be closed by the wall of the valve. The plug-cock D may now be turned so that the water in the chamber B' of the filter can find vent through the passage 5 to the waste-pipe 6, or said cock may be turned so that the passage $5^a$ may be opened and passage 5 closed, in which case the water will pass from the chamber B' through the disk B into the chamber $B^2$, and from thence out through the passage $5^a$ to the waste-pipe 6. A still further turn to the left of the valve C' will bring the port $b^2$ therein opposite the inlet, and the water therefrom will then be directed into the chamber F and through the passage $2^a$ into the chamber $B^2$, from which it may pass to the waste-pipe 6 either through the passage $5^a$ direct or through the disk B into the chamber B', and from thence to the waste-pipe through the passage 5, according to the manipulation of the plug-cock D. Said plug-cock, as stated, is a three-way cock—that is, it is arranged to either close both passages 5 and $5^a$ or to establish communication from either one of them to the waste-pipe 6 or from both of them to said pipe—and is of a well-known construction and needs no detailed description. Suffice it to say that when it is in the position shown in Figs. 1 and 2 both passages 5 and $5^a$ are closed. When turned one-eighth to the right, the passage $5^a$ alone will be put in communication with the waste-pipe, one-quarter farther will put both passages 5 and $5^a$ in communication with the waste-pipe, and one-quarter more will put the passage 5 alone in communication with said waste-pipe.

It is apparent that by the proper manipulation of the valve C' water may be caused to pass in either direction through the filtering-disk B and thence through the outlet-pipe 4, or by proper manipulation of the cock D, in connection with the above, through said disk in either direction and thence, through the passages 5 and $5^a$, to the waste-pipe 6, or may be directed from either of the chambers F F' down across the face of either side of the disk B and through the passage 5 or $5^a$ to the waste-pipe. The passages 2 $2^a$ are inclined somewhat toward the filtering-disk B in order that for cleaning purposes the stream of water from said passages may cover as much of the plate as possible. This construction herein described is arranged to adapt the filter to be easily and expeditiously cleaned by the manipulation of the valves C' and D only without opening the filter.

Assuming that the filter has been in service long enough to necessitate the cleaning of the disk B and the water has been passing from the inlet, through the chamber F, into the chamber $B^2$ through the filtering-disk B and chambers B' and F', then to cleanse the side of the filtering-disk exposed to the action of the unfiltered water—viz., that side in the chamber $B^2$—and to cleanse that chamber and the chamber F and the passage $2^a$ between them the process would be as follows, the position of the valve C' being that shown in Figs. 1 and 2 and the cock D being closed: The valve C' would be turned first to the left until the port $b$ is opposite the inlet 3. This closes the outlet-port and directs a current of water from the inlet through said port $b$ into the chamber F' and thence to chamber B'. The plug-cock D is then manipulated to open the passage $5^a$ through said cock to the waste-pipe 6, and all accumulations of impurities on the side of the disk B which lies in the chamber $B^2$ will be washed off therefrom by the passage of the water through the said disk in a direction inverse to that by which said impurities were deposited and pass out of said chamber through the passage $5^a$ and the waste-pipe. Leaving said plug-cock D open, as described, the valve C' is again operated to bring the port $b^2$ opposite the inlet-port 3, and the current of water is then shut off from the chamber F' and directed through the chamber F down against the face of the filtering-disk B in the chamber $B^2$ and washes it and the interior of said last-named chamber and the passage $5^a$. The valve C' may now be turned back until the port $a^2$ lies opposite the inlet, and after a moment or two, during which filtered water will give a final rinsing to the chamber B², the plug-cock may be turned to close said passage 5ª, and the water passing through the filtering-disk will fill said chamber B² and pass up through the chamber F and through the port b² to the outlet. The side of the disk B in the chamber B' may be cleansed in the same manner by a proper manipulation of the valves C' and D.

The herein-described filter is particularly adapted to be placed in the supply-pipes of houses, factories, or in similar locations where a large supply of filtered water is required, as the construction thereof makes it possible to provide a large filtering area in such form that it takes up but little room, as said disk B can be made of very considerable diameter without materially increasing the dimensions of the filter-body in a line transverse to the disk B.

A further advantage of a filter provided with a filtering-disk standing normally on its edge is that the coarser impurities will be deposited by gravity in the bottom of the chambers B' and B², and thus will not obstruct the action of the said disk.

Having thus described my invention, what I claim, and desire to secure by Letters Patent, is—

1. A filter consisting of a hollow body, a filtering-disk in said body and abutting against a shoulder therein dividing said body into two chambers, screw-threads in one of said chambers, a threaded ring engaging said screw-threads for removably locking said disk in said filter-body, a valve-body located on said body, a valve therein, means for rotating said valve, a chamber in said valve-body at each end of said valve, inlet and outlet ports in said valve-body, a series of ports in said valve for establishing communication alternately between said inlet and outlet ports and either of said chambers in the valve-body, passages from the said chambers in the body of the filter to a waste-pipe, and a multiple-way valve for controlling said passages, whereby either one or both of them may be placed in communication with said waste-pipe, substantially as described.

2. A filter consisting of a hollow body one side of which is open, a disk for closing said opening, a filtering-disk in said body, and abutting against a shoulder therein dividing said body into two chambers, means for removably securing said disk therein, a valve-body located on said filter, a valve therein, a stem for operating said valve, a chamber in said valve-body at each end of said valve, inlet and outlet ports in the valve-body, a series of ports in the valve, whereby, by the operation of the latter water from said inlet may be directed through said disk in either direction to a common outlet or across either face of said disk, a waste-pipe communicating with said two chambers in the filter-body, and a valve for controlling said waste-pipe, substantially as described.

ARCHIDELL N. SPRAGUE.

Witnesses:
   H. A. CHAPIN,
   K. I. CLEMONS.